US012102574B2

(12) United States Patent
Knott

(10) Patent No.: US 12,102,574 B2
(45) Date of Patent: Oct. 1, 2024

(54) WHEELCHAIR BUMPER WINGS

(71) Applicant: Kathleen J. Knott, West Islip, NY (US)

(72) Inventor: Kathleen J. Knott, West Islip, NY (US)

(*) Notice: Subject to any disclaimer, the term of this patent is extended or adjusted under 35 U.S.C. 154(b) by 542 days.

(21) Appl. No.: 17/140,452

(22) Filed: Jan. 4, 2021

(65) Prior Publication Data

US 2022/0211561 A1 Jul. 7, 2022

(51) Int. Cl.
*A61G 5/10* (2006.01)

(52) U.S. Cl.
CPC .................................... *A61G 5/10* (2013.01)

(58) Field of Classification Search
CPC ............ A61G 2203/70; A61G 2203/72; A61G 2203/723; A61G 5/10; B60R 19/28; B60R 19/16
USPC ......... 280/250.1, 304.1, 304.3; 293/119, 126
See application file for complete search history.

(56) References Cited

U.S. PATENT DOCUMENTS

| | | | | | |
|---|---|---|---|---|---|
| 1,651,728 | A * | 12/1927 | Roe | A61G 5/1081 293/128 |
| 4,403,673 | A * | 9/1983 | Ball | A61G 5/10 280/62 |
| 9,308,142 | B2 * | 4/2016 | Harding | A61G 5/02 |
| 2001/0038189 | A1 * | 11/2001 | Caldwell | B62M 1/14 280/244 |
| 2003/0085547 | A1 * | 5/2003 | Handago | A61G 5/10 280/304.1 |

(Continued)

FOREIGN PATENT DOCUMENTS

| | | | | |
|---|---|---|---|---|
| FR | 2741583 A1 * | 5/1997 | A61G 5/045 |
| WO | WO-2011055098 A1 * | 5/2011 | A61G 5/02 |
| WO | WO-2015040287 A1 * | 3/2015 | A41D 1/16 |

OTHER PUBLICATIONS

"Wheelchair Rear Bumper" by DarkRubyMoon https://www.instructables.com/Wheelchair-Rear-Bumper/ accessed on Feb. 6, 2023.*

(Continued)

*Primary Examiner* — Minnah L Seoh
*Assistant Examiner* — Christopher B Wehrly
(74) *Attorney, Agent, or Firm* — Delain Law Office, PLLC; Nancy Baum Delain

(57) ABSTRACT

Disclosed embodiments provide a wheelchair bumper wing. The wheelchair bumper wing may be installed on a manual or electric wheelchair. In embodiments, two wheelchair bumper wings are used, with one wheelchair bumper wing installed on each side of the wheelchair. The wheelchair bumper wings serve to protect the wheels and other components of the wheelchair. In particular, when navigating narrow areas such as doorways, it is possible for a wheelchair wheel to collide with an obstruction, such as a pole or wall, which can potentially cause damage to the wheelchair and/or cause injury to the person sitting in the chair. Some wheelchairs can be quite expensive. The wheelchair bumper wings of disclosed embodiments can help to protect wheels, axles, motors, and other components of a wheelchair in the event of side contact with a structure such as a pole, wall, door jam, or other object. Disclosed embodiments can be used with conventional manual wheelchairs and/or motorized wheelchairs.

8 Claims, 14 Drawing Sheets

(56) References Cited

U.S. PATENT DOCUMENTS

| | | | | |
|---|---|---|---|---|
| 2011/0133512 A1* | 6/2011 | Mildner | B60R 19/36 | 267/136 |
| 2016/0143793 A1* | 5/2016 | Holub | A61G 5/128 | 297/440.1 |
| 2018/0161222 A1* | 6/2018 | Rios | A61G 5/128 | |

OTHER PUBLICATIONS

Translation of FR-2741583-A1 (Year: 1997).*

* cited by examiner

WHEELCHAIR BUMPER WINGS

FIELD

The present invention relates generally to accessories for wheelchairs, and more particularly to a wheelchair bumper wing.

BACKGROUND

A wheelchair is a wheeled mobility device in which a user sits. A wheelchair is an important tool to enable some mobility and independence for individuals that have trouble walking or are unable to walk at all. A wheelchair can be propelled manually (by turning the wheels by hand), or by a third party may pushing the wheelchair, or via various automated systems.

Wheelchairs come in variations allowing either manual propulsion by the seated occupant turning the rear wheels by hand, or electric propulsion by motors. There are often handles behind the seat to allow for individuals not sitting in the chair to push the wheelchair. Wheelchairs are used by people for whom walking is difficult or impossible due to illness, injury, or disability.

A basic manual wheelchair incorporates a seat, footrests and four wheels. The wheels may be of various sizes. For example, in some embodiments, there may be two caster wheels at the front, and two large wheels at the back. The two larger wheels in the back usually have hand rims, which are metal or plastic circles approximately two centimeters in thickness.

Electric wheelchairs are propelled by a motor and battery. They can be quite complex, and may involve computerized components. They may be operated with a joystick or push buttons. Electric wheelchairs need strong frames to support the motor and battery so they are very heavy and also quite expensive as compared with most manual wheelchairs. As wheelchairs are essential for those with mobility issues, it is desirable to have improvements in wheelchairs.

SUMMARY

Disclosed embodiments provide a wheelchair bumper wing. The wheelchair bumper wing may be installed on a manual or electric wheelchair. In embodiments, two wheelchair bumper wings are used, with one wheelchair bumper wing installed on each side of the wheelchair. The wheelchair bumper wings serve to protect the wheels and other components of the wheelchair. In particular, when navigating narrow areas such as doorways, it is possible for a wheelchair wheel to collide with an obstruction, such as a pole or wall, which can potentially cause damage to the wheelchair and/or cause injury to the person sitting in the chair. Some wheelchairs can be quite expensive. The wheelchair bumper wings of disclosed embodiments can help to protect wheels, axles, motors, and other components of a wheelchair in the event of side contact with a structure such as a pole, wall, door jam, or other object. Disclosed embodiments can be used with conventional manual wheelchairs and/or motorized wheelchairs.

In some embodiments, there is provided a wheelchair bumper wing comprising: an elongated member, wherein the elongated member comprises: a front section; a middle section; a rear section; and at least one wheelchair mount; wherein the middle section flares at a flare angle with respect to a longitudinal tangent line.

In some embodiments, there is provided a wheelchair, comprising: a first wheelchair bumper wing affixed to a first side of the wheelchair; a second wheelchair bumper wing affixed to a second side of the wheelchair; wherein the first wheelchair bumper wing and the second wheelchair bumper wing each comprise: an elongated member, wherein the elongated member comprises: a front section; a middle section; a rear section; and at least one wheelchair mount; wherein the middle section flares at a flare angle with respect to a longitudinal tangent line.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Figure 1A:
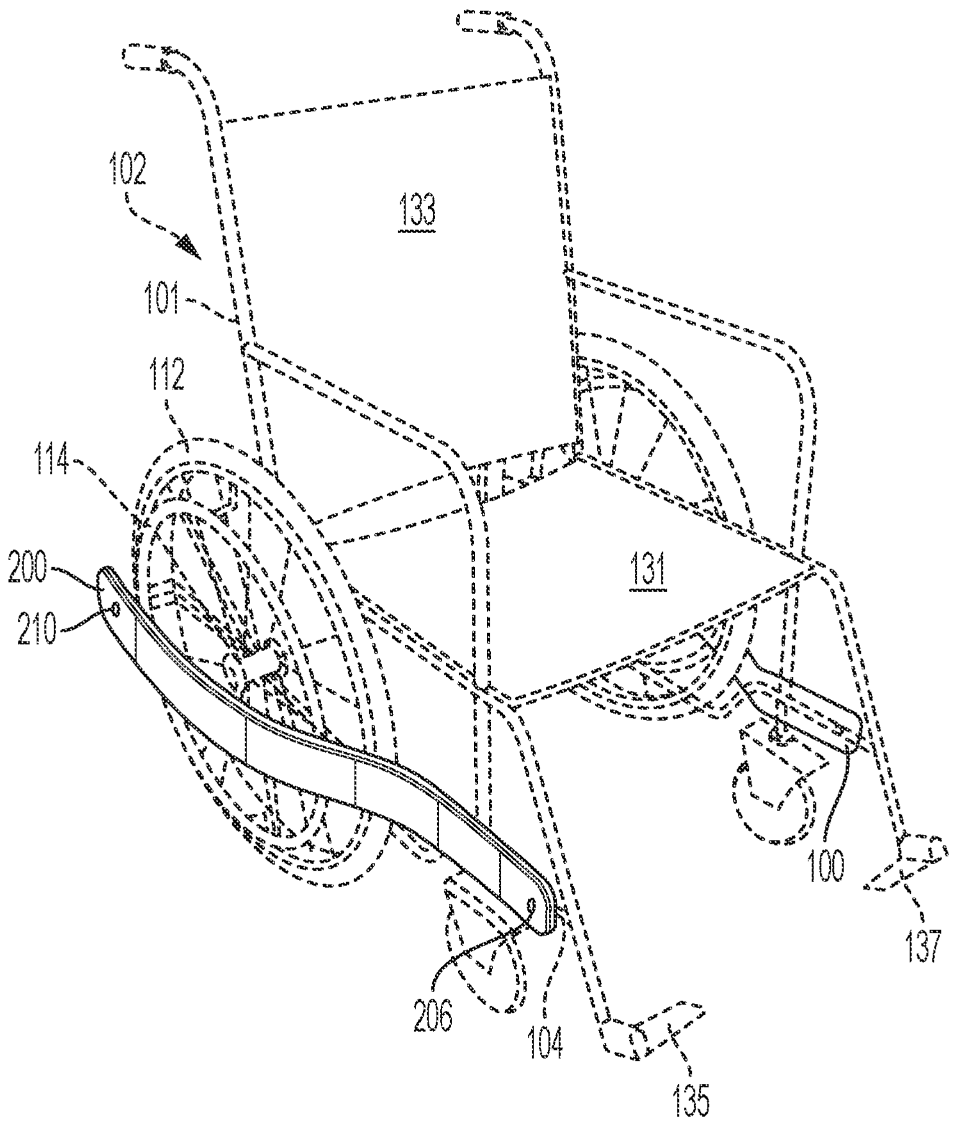
FIG. 1A shows an example of a wheelchair bumper wing installed on a wheelchair in accordance with disclosed embodiments.

Disclosed embodiments provide a wheelchair bumper wing (or "wing"). The wheelchair bumper wing may be installed on a manual or electric wheelchair. In embodiments, two wheelchair bumper wings are used, with one wheelchair bumper wing installed on each side of the wheelchair. The wheelchair bumper wings serve to protect the wheels, hand rims, and other components of the wheelchair. In particular, when navigating narrow areas such as doorways, it is possible for a wheelchair wheel to collide with an obstruction, such as a pole or wall, which can potentially cause damage to the wheelchair, and worse, hurt the user's hand, which may be wedged between the hand rim and the obstruction on a manually-operated wheelchair. Some wheelchairs can be quite expensive. The cost of an electric wheelchair can typically range anywhere from $5,000 to $20,000. The wheelchair bumper wings of disclosed embodiments can help to protect wheels, hand rims, axels, motors, and other components of a wheelchair, as well as the user, in the event of side contact with a structure such as a pole, wall, door jam, or other object.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined ("mixed and matched") in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements. For the purposes of disclosure, the word, "substantially" is defined as "for the most part". It means "to a great extent," but having some room for some minor variation.

FIG. 1A shows an example of a wheelchair bumper wing 200 installed on a wheelchair 102 in accordance with disclosed embodiments. The wheelchair 102 comprises a seat 131, back 133, a first footrest 135 and a second footrest 137. The wheelchair bumper wing 200 may include a front attachment point 206. The front attachment point 206 may be secured to the front strut 104 of wheelchair 102. In a typical wheelchair, the widest portion of the wheelchair is the region with rear wheel 112 and hand rim 114. The wheelchair bumper wing 200 is flared such that it is disposed along the outside of hand rim 114. Some embodiments may further include a rear attachment point 210, which may be used to affix the wheelchair bumper wing 200 to the frame of the wheelchair in the rear. In embodiments, the attachment points 206 and 210 of the wheelchair bumper wing 200 may be holes formed within the wheelchair bumper wing to allow fasteners such as bolts, screws, or pins to engage with corresponding fixtures on the wheelchair frame 101. The wheelchair frame includes the rigid, non-rotating portions of the wheelchair 102, and is typically fabricated from a metal such as steel, aluminum, or other suitable alloy. The wheelchair bumper wing 200 serves to protect the side of the wheelchair 102 from damage, as well as prevent injury to a person sitting in the wheelchair, due to collision with an obstacle such as a wall or post. In this example, wheelchair 102 further includes another wheelchair bumper wing 100 that is similar to wheelchair bumper wing 200, mounted on the other side of the wheelchair 102.

Figure 1B:
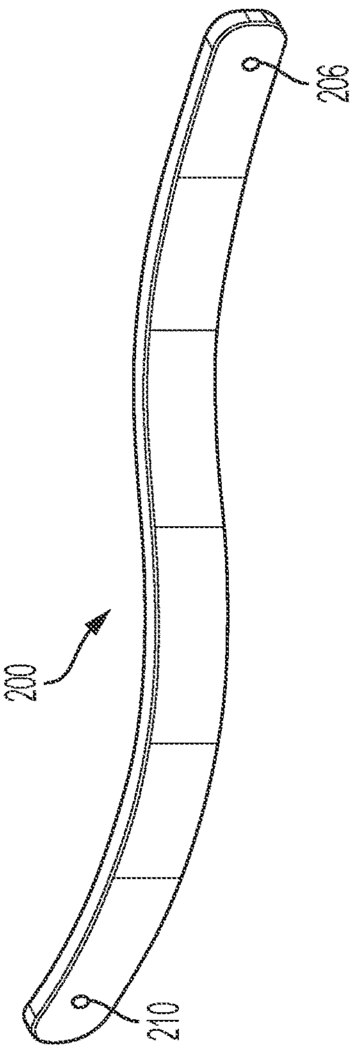
FIG. 1B shows a top-down front perspective view of a wheelchair bumper wing in accordance with disclosed embodiments (uninstalled from a wheelchair).
Figure 1C:
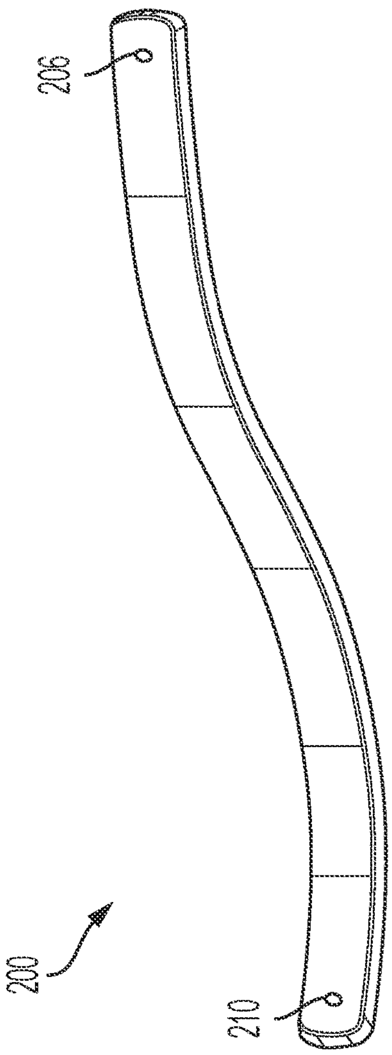
FIG. 1C shows a bottom-up back perspective view of the wheelchair bumper wing of FIG. 1B in accordance with embodiments.

FIG. 1B shows a top-down front perspective view of a wheelchair bumper wing 200 (uninstalled from wheelchair) in accordance with disclosed embodiments. FIG. 1C shows a bottom-up back perspective view of the wheelchair bumper wing 200 in accordance with embodiments. Wheelchair bumper wing 200 has a front attachment point 206 and a rear attachment point 210. In some embodiments, the wheelchair bumper wing 200 may be mounted at the front area of the wheelchair frame, in the region where a footrest is typically affixed.

In embodiments, the wheelchair bumper wing 200 may be comprised of metal. In embodiments, the wheelchair bumper wing 200 may be comprised of steel, aluminum, or other suitable alloy. In other embodiments, the wheelchair bumper wing 200 may be comprised of plastic. In some embodiments, the wheelchair bumper wing 200 may be comprised of fiberglass. In some embodiments, the wheelchair bumper wing 200 may be comprised of polycarbonate. In some embodiments, the wheelchair bumper wing 200 may be comprised of composite. Lighter-weight materials, such as polycarbonate and fiberglass, provide protection of the wheelchair components such as wheels, handle rims, and axles, without adding excessive weight to the wheelchair. In some embodiments, the wheelchair bumper wing 200 may be comprised of a flexible material to help absorb shock. Examples of such flexible materials can include fiberglass, plastic, or other suitable materials. These are examples, but any suitable material is included within the scope of the invention.

Figure 1D:
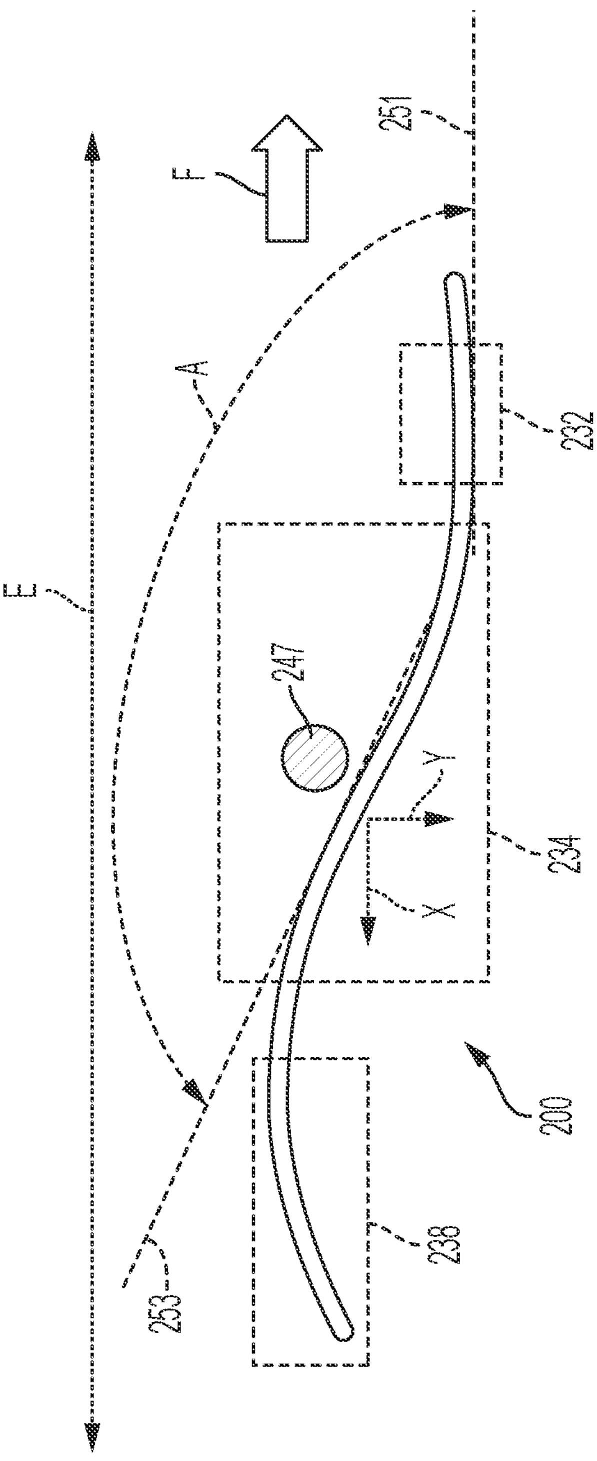
FIG. 1D shows a top-down view of the wheelchair bumper wing in accordance with disclosed embodiments.

FIG. 1D shows a top-down view of wheelchair bumper wing 200 in accordance with disclosed embodiments. Wheelchair bumper wing 200 comprises a front section 232, a middle section 234, and a rear section 238. The front section 232 is affixed to a wheelchair near the front of the wheelchair. The front section longitudinal tangent line 251 is parallel to the longitudinal axis E of the wheelchair bumper wing, and tangential to the wheelchair bumper wing within the front section 232.

The middle section 234 is flared to accommodate the larger rear wheels and hand rims of a wheelchair. The middle section tangent line 253 is tangential to the wheelchair bumper wing within the middle section 234. An angle A is formed between the front section tangent line 251, and the middle section tangent line 253. Angle A is referred to as the "flare angle" of the wheelchair bumper wing. In embodiments, the flare angle has a value ranging from 130 degrees to 170 degrees. In some embodiments, the flare angle has a value ranging from 145 degrees to 160 degrees. The flare angle should be smooth and not actuate, so as to avoid weak points. The flare angle allows the wheelchair bumper wing to reduce the shock felt by a user of the wheelchair when it contacts an object such as a post or wall, by distributing forces in the X and Y direction, thus protecting the wheelchair from damage, as well as minimizing discomfort to the wheelchair user in the event of a collision with an object, such as post 247 (not part of embodiments, but instead the environment shown), when a wheelchair on which the wheelchair bumper wing 200 is mounted, is moving forward in direction F, with respect to the post 247. Thus, embodiments can include a wheelchair bumper wing comprising an elongated member, wherein the elongated member comprises a front section, a middle section, a rear section, an attachment point disposed on the front section to mount to a front portion of a wheelchair, wherein the middle section flares at an angle with respect to a longitudinal tangent line. The middle section flares at the flare angle A.

As shown, in some embodiments, the edges and sides of the bumper wing are substantially smooth without sharp edges or protrusions, such that the bumper wing does not damage any property it might bump into. This will also prevent a user from hurting himself/herself in case he/she touches it.

Figure 2:
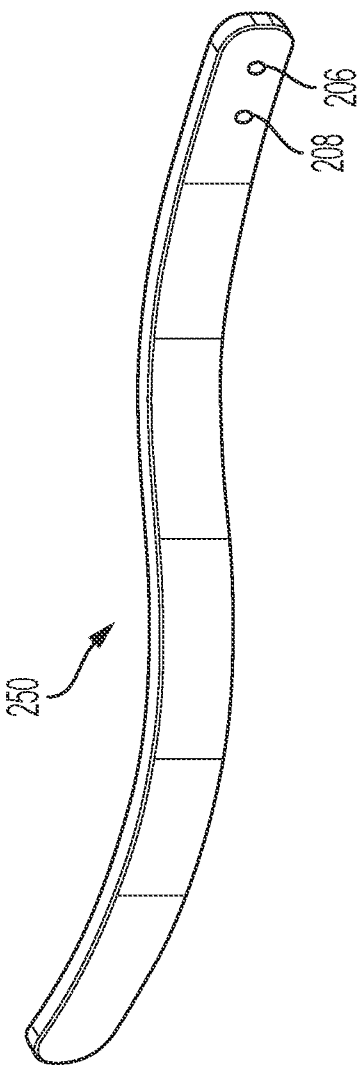
FIG. 2 shows another example of a wheelchair bumper wing in accordance with disclosed embodiments.

FIG. 2 shows a top-down front perspective view of a wheelchair bumper wing 250 in accordance with additional disclosed embodiments. The wheelchair bumper wing 250 is similar to bumper wing 200 of FIGS. 1A-1D, with the main difference being that there is two front attachment points 206, 208 for wheelchair bumper wing 250 and no rear attachment points. Two attachments at the front of the wheelchair bumper wing 250 strengthens its hold to the wheelchair, and eliminates the need for a rear attachment point. Thus, embodiments can utilize a front-only connection, to accommodate the physical differences of various wheelchair types. Also, in the event that there is no suitable mounting location at the rear of a particular wheelchair, the wheelchair bumper wing 250 may be used with front-only mounting (attachment points 206 and 208 only).

Figure 3:
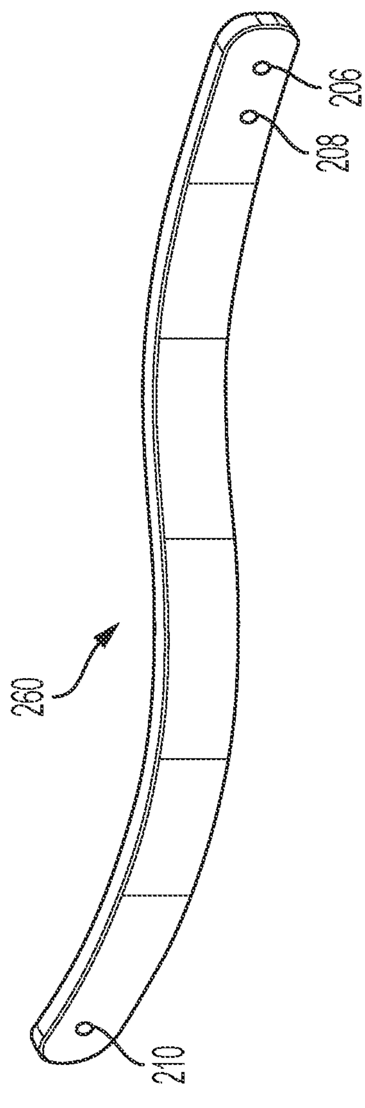
FIG. 3 shows another example of wheelchair bumper wing in accordance with disclosed embodiments.

FIG. 3 shows a front top-down perspective view of a wheelchair bumper wing 260 in accordance with additional disclosed embodiments. The wheelchair bumper wing 260 is similar to bumper wing 200 of FIGS. 1A-1D, with the main difference being that there is two front attachment points 206, 208 for wheelchair bumper wing 260, as well as a rear attachment point 210.

In embodiments, the attachment points, 206, 208, and 210, or others may be a hole or opening in the bumper wing, such that a fastener like a screw or other suitable piece may attach the bumper wing through the attachment point to the wheelchair.

In embodiments that utilize wheelchair bumper wing 260, the wheelchair bumper wing 260 may be affixed to a wheelchair utilizing first front attachment point 206 and rear attachment point 210. Alternatively, the wheelchair bumper wing 260 may be affixed to a wheelchair utilizing first front attachment point 206, second front attachment point 208, and rear attachment point 210. Alternatively, the wheelchair bumper wing 260 may be affixed to a wheelchair utilizing first front attachment point 206 and second front attachment point 208, and not be connected at the rear (i.e. rear attachment point 210 is not used).

Figure 4:
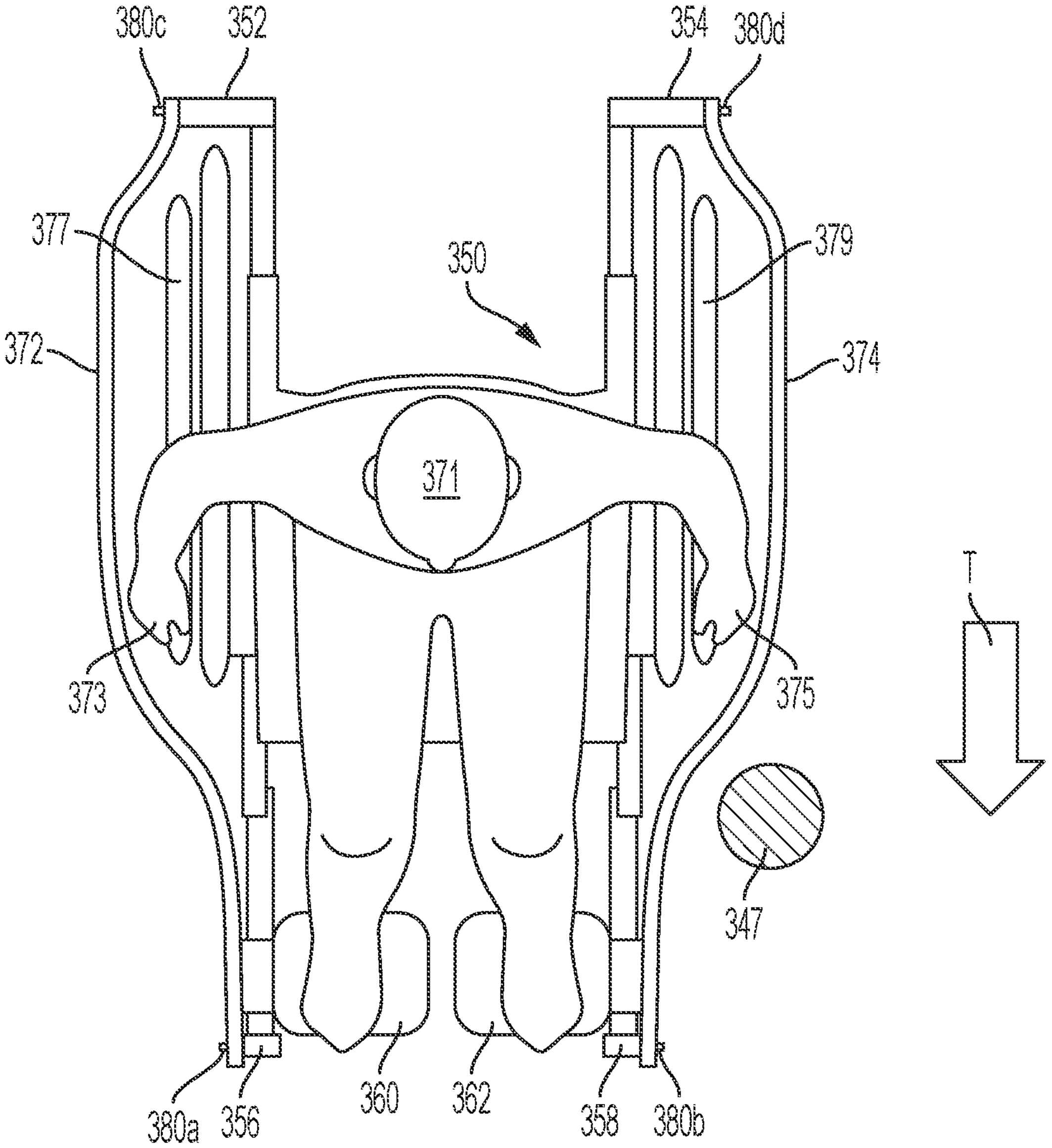
FIG. 4 shows a person in a wheelchair that has bumper wings installed in accordance with disclosed embodiments.

FIG. 4 shows a top-down view of a person in a wheelchair that has bumper wings installed in accordance with disclosed embodiments. Wheelchair 350 has a first wheelchair bumper wing 372 installed on a first side of wheelchair 350, and a second wheelchair bumper wing 374 installed on a second side of wheelchair 350. Front strut 356 is part of the frame of wheelchair 350 that secures footrest 360. Front strut 358 is part of the frame of wheelchair 350 that secures footrest 362. The wheelchair bumper wing 372 is affixed to the front strut 356. The wheelchair bumper wing 374 is affixed to the front strut 358. The wheelchair bumpers wings are attached via fasteners 380*a*, 380*b*, 380*c*, and 380*d*. The fasteners are shown with heads extending outward. This is just such that they can be clearly seen in the drawings. Although fasteners may extend outwards as shown here, in implementations fasteners with flat heads may be used, such as the flat screw head visible in FIG. 5B. This would allow the fastener to be substantially flush with the outside of the bumper wing.

At the rear of the wheelchair 350, wheelchair bumper wing 372 is affixed to rear frame member 352. Similarly, at the rear of the wheelchair 350, wheelchair bumper wing 374 is affixed to rear frame member 354. The wheelchair bumper wings 372 and 374 serve to protect the wheelchair and its user from collision with obstacles. As shown in FIG. 4, the wheelchair 350 is traveling forward in a direction indicated by arrow T, and is set to collide with post 347. Wheelchair bumper wing 374 serves to absorb force from the impending collision with the post 347 in the environment, thereby protecting the wheelchair 350. In particular, since wheels are often the outermost parts of the wheelchair as it travels in a forward direction, the wheelchair bumper wings of disclosed embodiments can help prevent damage to wheels, tires, hand rims, spokes, connected components such as axles, as well as the user's hands on the hand rims.

As can be seen in FIG. 4, a user 371 is using their hands 373 and 375 to propel the wheelchair 350 using hand rims 377 and 379, respectively. With disclosed embodiments, the wheelchair bumper wings 372 and 374 provide protection for the hands 373 and 375 of the user 371 in the event of a collision with an object. Such a collision may occur, for example, when misjudging the location or size of a doorway opening, or operating in an unfamiliar or crowded environment.

Figure 5A:
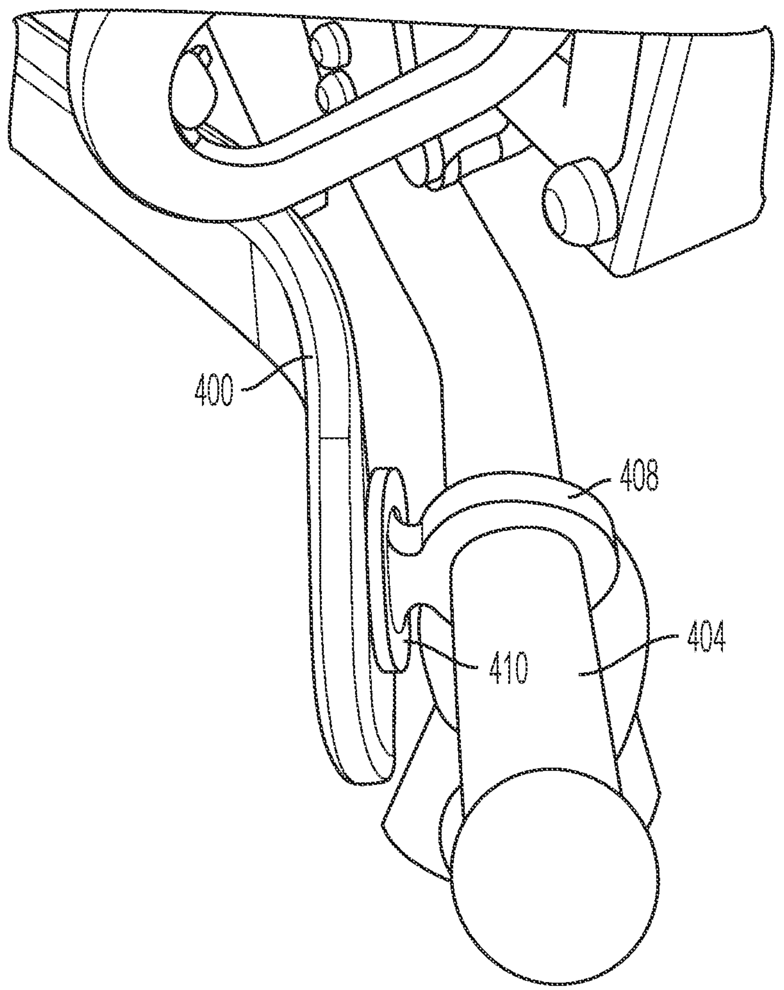
FIG. 5A shows an exemplary front mount point for a wheelchair bumper wing installed on a wheelchair in accordance with disclosed embodiments.
Figure 5B:
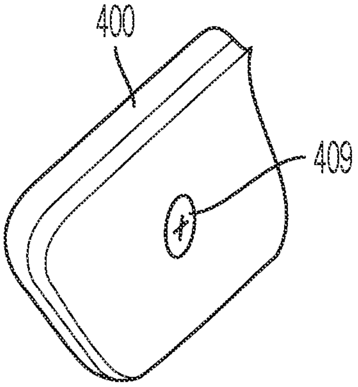
FIG. 5B shows a partial perspective view of the bumper wing of FIG. 5A.

FIG. 5A shows an exemplary front mount point for a wheelchair bumper wing installed on a wheelchair in accordance with disclosed embodiments. FIG. 5B shows a partial perspective view of the bumper wing of FIG. 5A with fastener visible. In this embodiment, wheelchair bumper wing 400 is affixed to front strut 404. A collar bracket 408 is affixed to the front strut 404. A mount plate 410 is affixed to the collar bracket 408. The wheelchair bumper wing 400 is affixed to the mount plate 410 with one or more fasteners 409, such as screws, pins, bolts, or the like. In some embodiments, washers, gaskets, and/or rubber blocks may be disposed in between the wheelchair bumper wing 400 and the mount plate 410. In some embodiments, the fastener may have a flat head as shown at 409, such that the fastener head is flush with the bumper wing.

Figure 6:
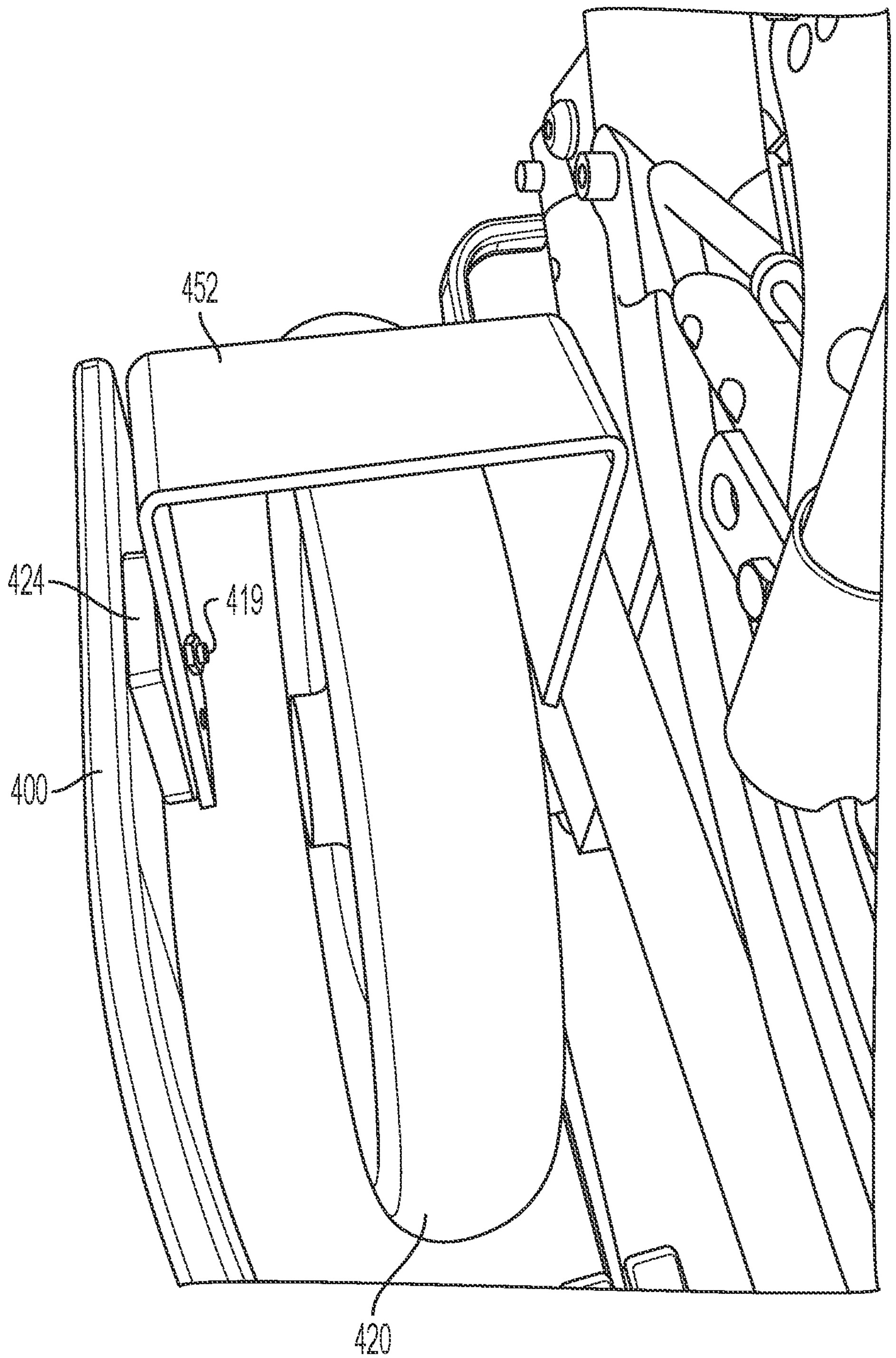
FIG. 6 shows an exemplary rear mount point for a wheelchair bumper wing installed on a wheelchair in accordance with disclosed embodiments.

FIG. 6 shows an exemplary rear mount point for wheelchair bumper wing 400 installed on a wheelchair in accordance with disclosed embodiments. Wheelchair bumper wing 400 is mounted at the rear to the rear frame member 452. The wheelchair bumper wing 400 is affixed to the rear frame member 452, which has at least one attachment point to accept one or more fasteners 419, such as screws, pins, bolts, or the like. In some embodiments, a rubber block 424 is disposed in between the wheelchair bumper wing 400 and the rear frame member 452. Rear frame member 452 is disposed above rear wheel 420 and is attached to the frame of a wheelchair. Rear wheel 420 may be an anti-tip caster, or a wheel of a motorized wheelchair. There are various types of wheelchairs to accommodate different users. Some wheelchairs may be fully motorized without hand rims. Disclosed embodiments can be used with both conventional "manual" wheelchairs, as well as motorized wheelchairs.

Figure 7A:
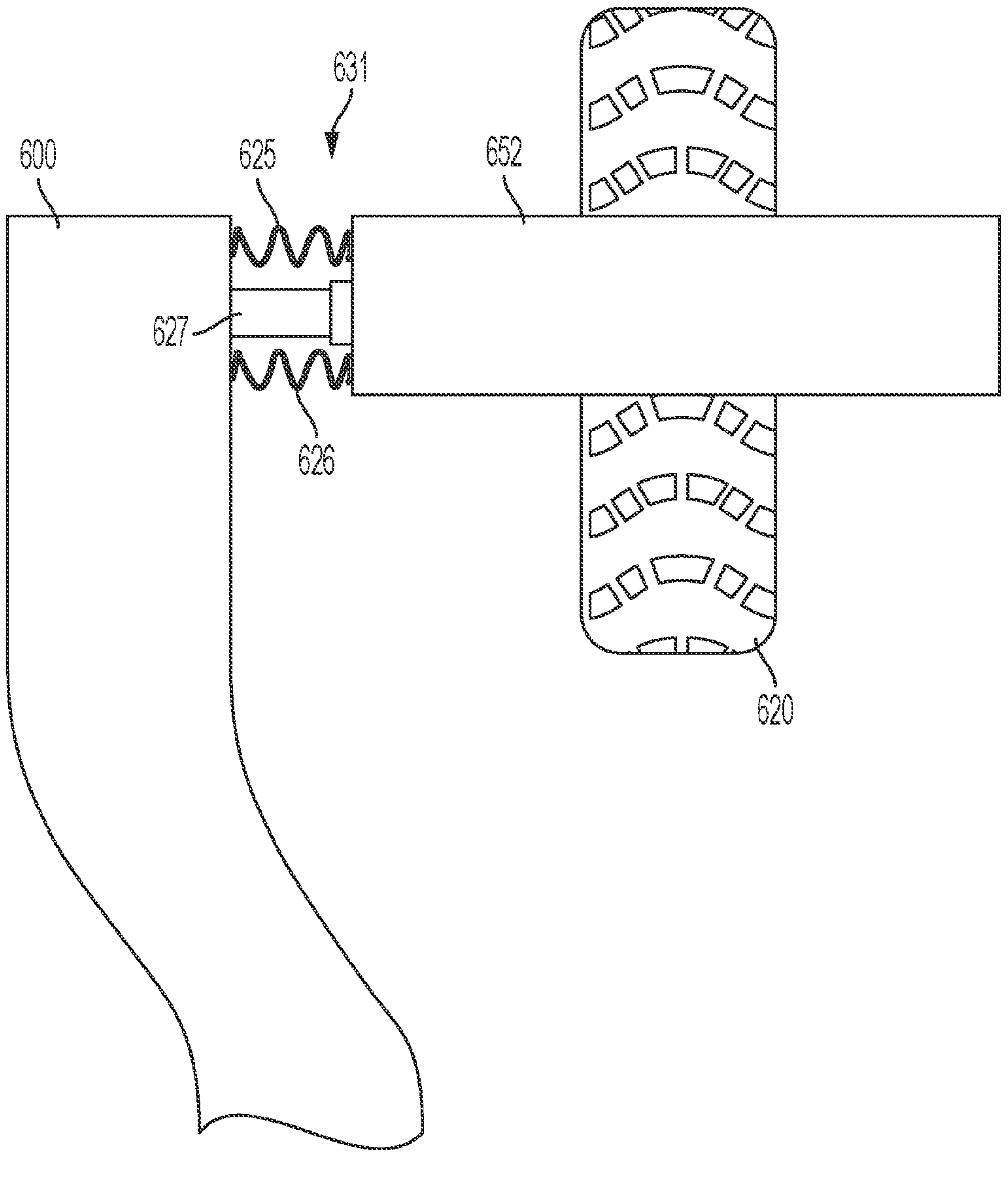
FIG. 7A shows an exemplary rear mount point for a wheelchair bumper wing installed on a wheelchair in accordance with additional disclosed embodiments.
Figure 7B:
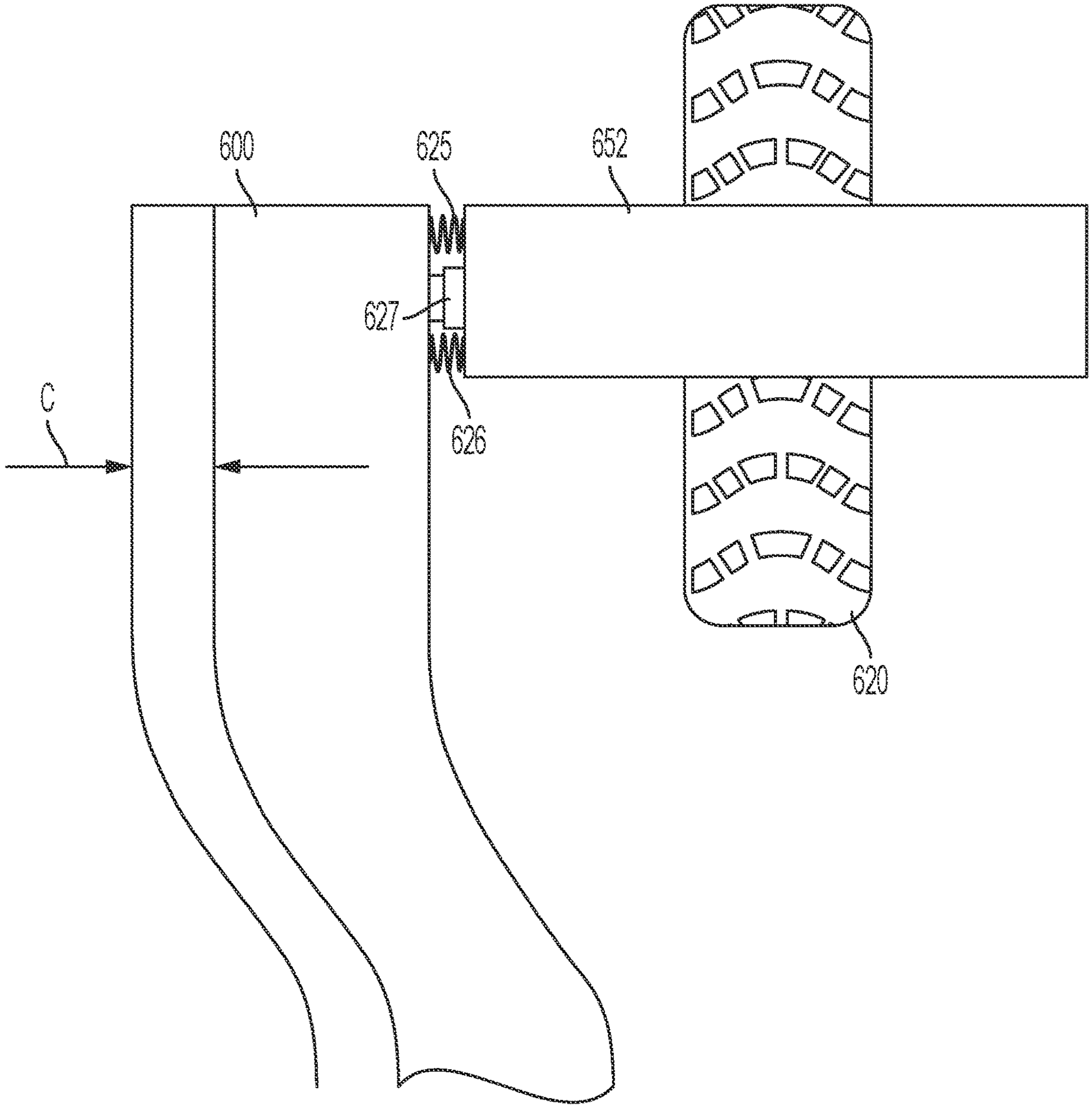
FIG. 7B shows the wheelchair bumper wing of FIG. 7A in a spring-compressed configuration.

FIGS. 7A and 7B show an exemplary rear mount point for a wheelchair bumper wing installed on a wheelchair in accordance with additional disclosed embodiments. Wheelchair bumper wing 600 comprises rear spring-loaded mount 631. In the top-down view of FIG. 7A, the arrangement is similar to that shown in FIG. 6 in that there is a rear frame member 652 that is disposed above rear wheel 620 and secures to the frame of a wheelchair. The wheelchair bumper wing 600 is affixed to the rear frame member 652 with spring-loaded rear mount 631. In embodiments, the spring-loaded mount 631 comprises a telescopic coupling 627 that is disposed between springs 625 and 626. The springs 625 and 626 serve to absorb force due to a collision between the wheelchair bumper wing 600 and another object. The springs can each be a resilient helical metal coil that can be pressed or pulled, but return to its former shape when released.

FIG. 7B shows the wheelchair bumper wing 600 in a spring-compressed configuration, in which the springs 625 and 626 are compressed, and the telescoping coupling 627 is collapsed compared with the configuration of FIG. 7A. The deflection, indicated by C, also reduces the total width of the wheelchair when equipped with wheelchair bumper wing 600. In some embodiments, the deflection C can range from 10 millimeters to 30 millimeters. In some embodiments, the deflection C can range from 5 millimeters to 20 millimeters. In some embodiments, the deflection C can range from 15 millimeters to 25 millimeters. When a wheelchair is equipped with two such wheelchair bumper wings (one on each side such as illustrated in FIG. 4), then the total width reduction is defined as twice the deflection (2×C). As an example, in a configuration with dual wheelchair bumper wings (e.g., as shown in FIG. 4), if the deflection C is 15 millimeters, then the total width reduction is 30 millimeters. In addition to serving to absorb shock from impact to objects, the deflection of the wheelchair bumper wings of this embodiment can allow a wheelchair to "squeeze" through some narrow openings that would not be possible with a rigid embodiment.

Figure 8:
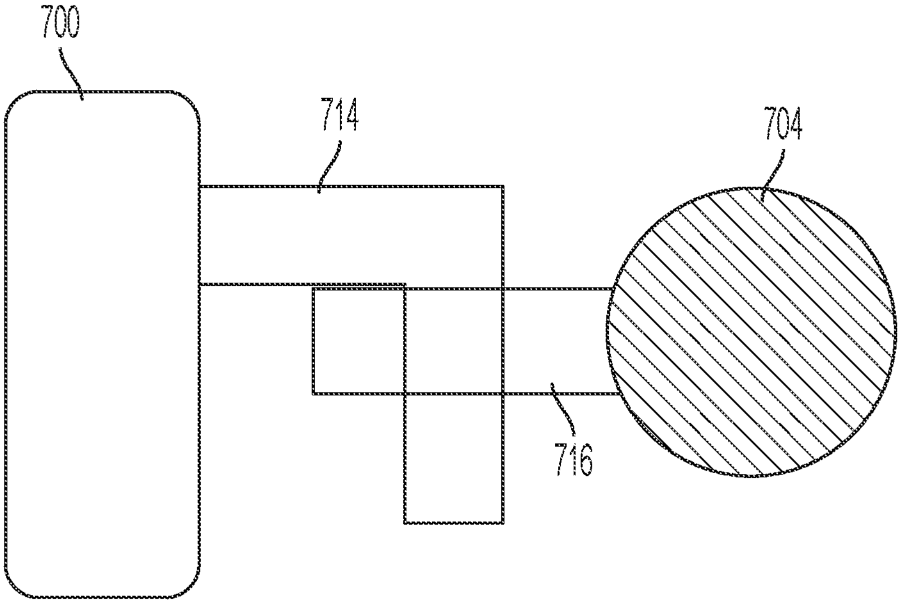
FIG. 8 shows a front view of an exemplary front attachment point for a wheelchair bumper wing installed on a wheelchair in accordance with additional disclosed embodiments.

FIG. 8 shows a front view of an exemplary front attachment point for a wheelchair bumper wing installed on a wheelchair in accordance with additional disclosed embodiments. In this embodiment, wheelchair bumper wing 700 has a hook 714 disposed thereon. The front strut 704 has a ring 716 affixed to the front strut 704 and oriented such that it can be coupled to the hook 714 by traversing the hook 714 through the ring 716.

Figure 9:
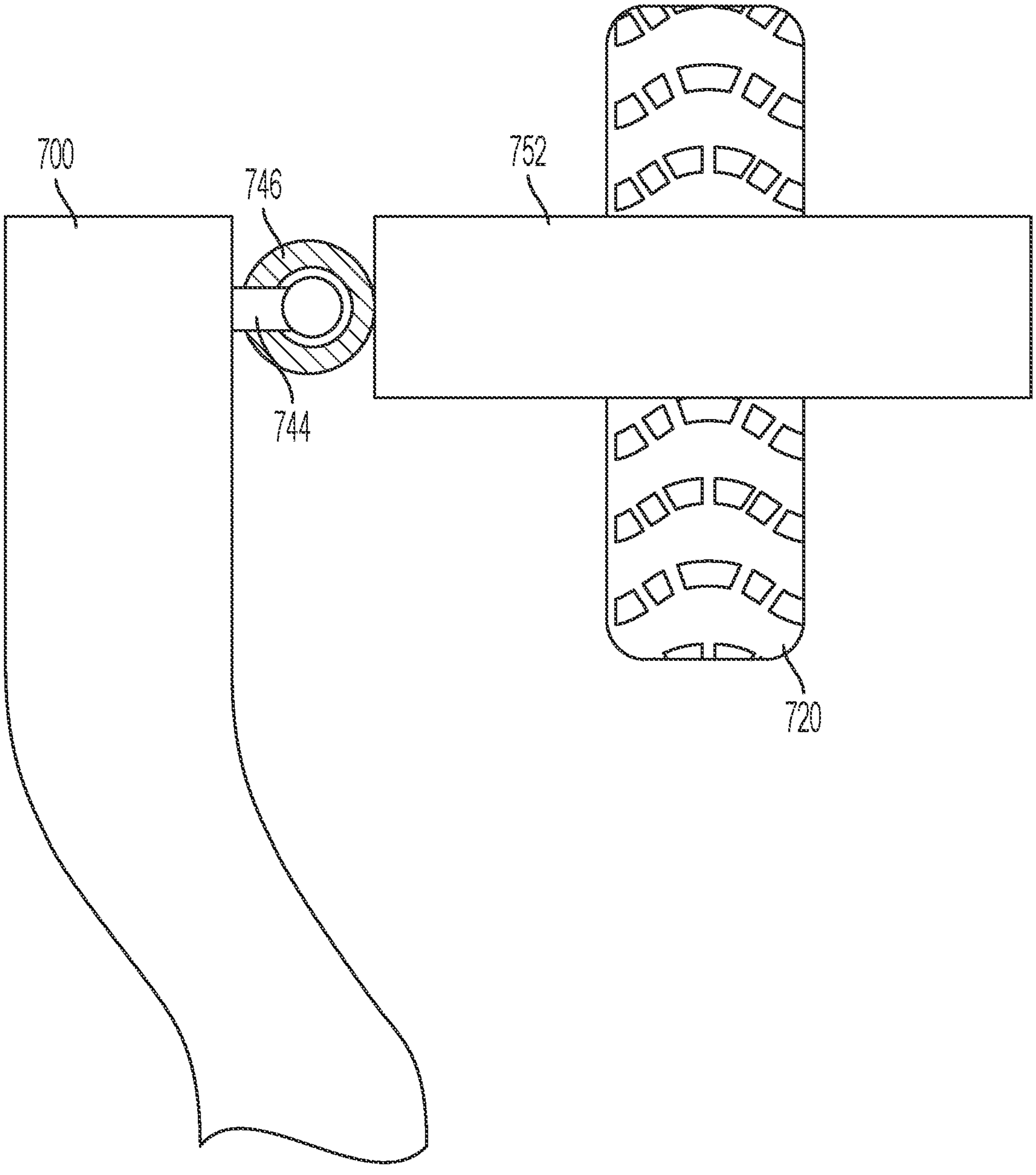
FIG. 9 shows an exemplary rear attachment point for a wheelchair bumper wing installed on a wheelchair in accordance with additional disclosed embodiments.

FIG. 9 shows an exemplary rear attachment point for a wheelchair bumper wing installed on a wheelchair in accordance with additional disclosed embodiments. FIG. 9 shows a top-down view of a hook and ring arrangement similar to what is shown in FIG. 8, as applied to the rear of the wheelchair bumper wing 700. At the rear of wheelchair bumper wing 700, a hook 744 (similar to hook 714 of FIG. 7) is engaged with ring 746 (similar to ring 716 of FIG. 7). Ring 746 is affixed to rear frame member 752 which is disposed above rear wheel 720 and secures to the frame of a wheelchair.

The embodiment shown in FIG. 8 and FIG. 9 can be quickly removed and/or installed. The hook and ring arrangement described allows the wheelchair bumper wing 700 to be quickly removed for traversing a narrow doorway, or folding the wheelchair for storage or transport. The wheelchair bumper wing 700 can then be quickly reinstalled simply by placing the hooks 714, 744 through the respective rings 716, 746. In this way, the user gets the safety and protection of the wheelchair bumper wings, with the convenience of easy removal when desired. Thus, in embodiments, the wheelchair bumper wing can comprise a front hook and a rear hook, wherein the front hook is configured and disposed to engage a front ring; and wherein the rear hook is configured and disposed to engage a rear ring. Embodiments can include a wheelchair, wherein the wheelchair includes a first wheelchair bumper wing and a second wheelchair bumper wing, wherein each bumper wing comprises a front hook, a rear hook, and wherein the front hook is configured and disposed to engage a corresponding front ring affixed to the wheelchair; and wherein the rear hook is configured and disposed to engage a corresponding rear ring affixed to the wheelchair.

Figure 10A:
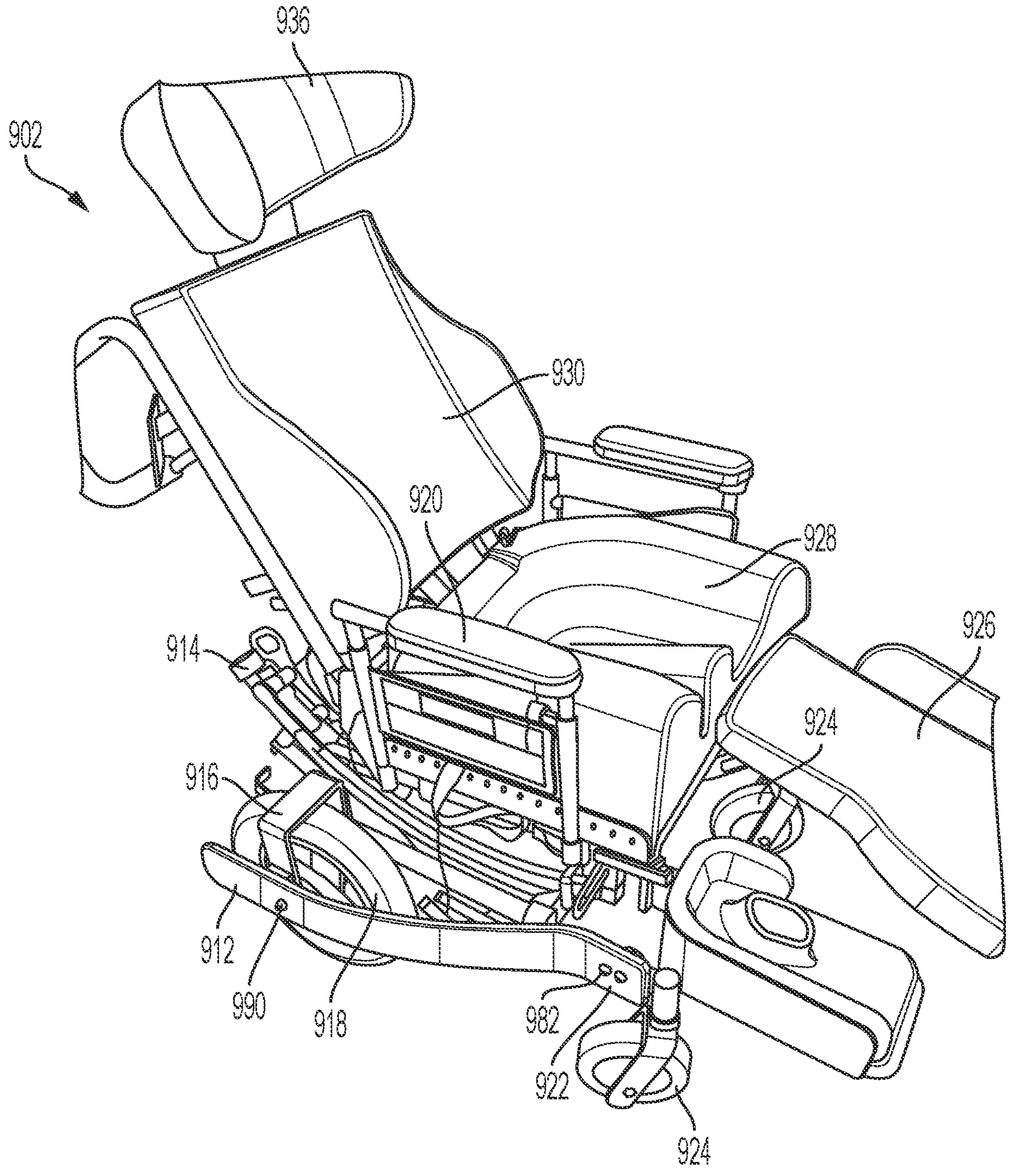
FIG. 10A is a side perspective view of a transport wheelchair utilizing embodiments of the present invention.
Figure 10B:
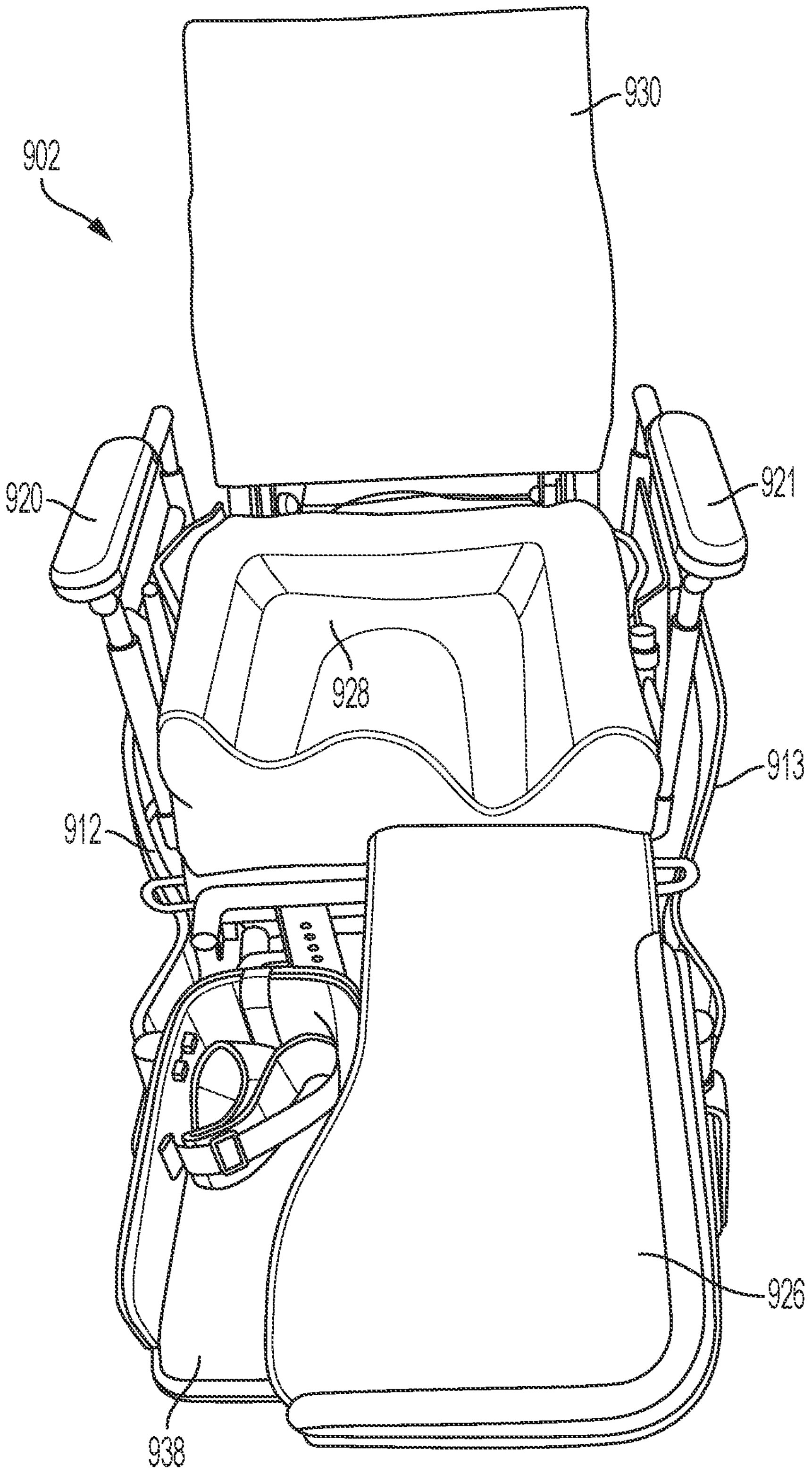
FIG. 10B is a front view of the wheelchair of FIG. 9A.
Figure 10C:
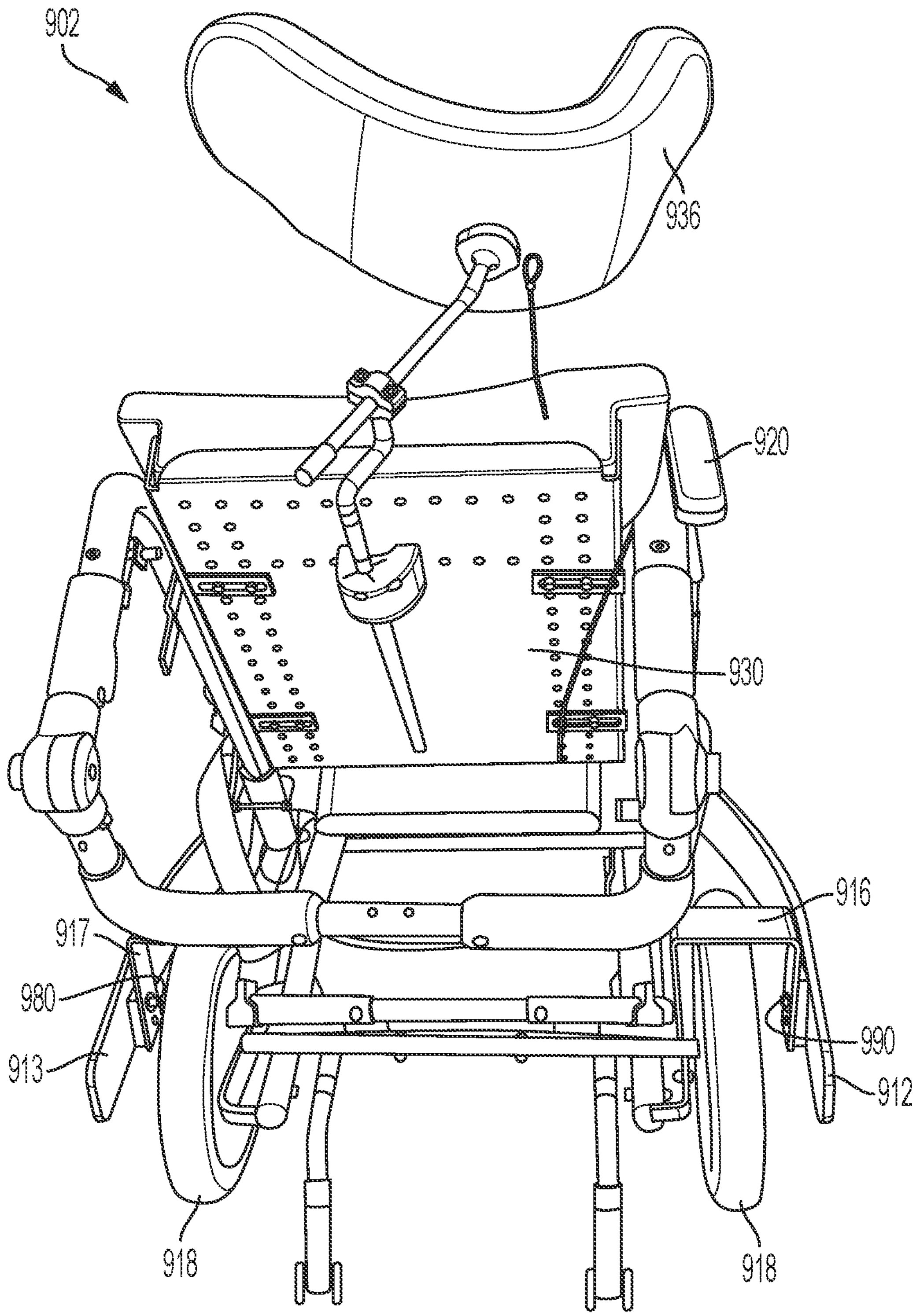
FIG. 10C is a rear view of the wheelchair of FIG. 9A.

FIGS. 10A-10C show views of a transport wheelchair utilizing embodiments of the present invention. FIG. 10A shows a side perspective view. FIG. 10B shows a front view. FIG. 10C shows a rear view. Transport wheelchairs or companion chairs are companion wheelchairs where the purpose is for a companion to push the user. Thus, wheelchairs of this variety typically do not have the large rear wheels or hand rims as shown in the wheelchair of FIG. 1A.

Referring now to FIGS. 10A-10C, wheelchair 902 comprises a seat portion 928, back portion 930, and may optionally include a headrest 936, footrest 938, and a leg support section 926. The configuration of the wheelchair to include or not include various components such as headrests or leg support sections may depend on the preferences and/or physical condition of the user being transported in the wheelchair 902. The wheelchair 902 includes front wheels, indicated generally as 924, and rear wheels, indicated generally as 918. The user may rest their arms on armrests 920 and 921 during use. Wheelchair 902 comprises a first wheelchair bumper wing 912 and a second wheelchair bumper wing 913. First wheelchair bumper wing 912 is affixed to the rear of the wheelchair via rear frame member 916. Second wheelchair bumper wing 913 is affixed to the rear of the wheelchair via rear frame member 917. As can be seen in FIG. 10A, wheelchair bumper wing 912 is affixed to the front of the wheelchair via front mount 922 (FIG. 5A shows details), and wheelchair bumper wing 913 is affixed in a similar manner on the other side of the wheelchair. The wheelchair bumper wing 913 is affixed in the rear similarly to as shown in FIG. 6. The wheelchair bumper wing 912 is attached via fasteners 982, 990. The wheelchair bumper wing 913 is attached via fastener 980 and another not shown.

The wheelchair bumper wings 912 and 913 serve to provide protection of the rear wheels 918 from impact due to collision with nearby objects. Additionally, the wheelchair bumper wings 912 and 913 serve to provide protection of the arms of the user of the wheelchair as their arms rest on the armrests 920 and 921. Since the wheelchair bumper wings 912 and 913 extend outward from the wheelchair beyond the rear wheels 918 and armrests 920 and 921, a nearby object such as a wall or post comes in contact with the wheelchair bumper wings before the object can strike the rear wheels and/or armrests of the wheelchair. In this way, the wheelchair and its user are protected from collisions with such objects, thereby improving safety and comfort of the user. Thus, embodiments include two front wheels and two rear wheels, where each wheelchair bumper wing extends outside of a rear wheel, such that each wheelchair bumper wing serves to provide collision protection for its corresponding rear wheel.

In some embodiments, there is provided a system comprising a wheelchair (electric or non-electric) and at least one wheelchair bumper wing. In some embodiments, the system includes two bumper wings. In some embodiments, the bumper wings are removable from the wheelchair. In some embodiments, the bumper wings are non-removable from the wheelchair.

As can now be appreciated, disclosed embodiments provide a wheelchair bumper wing that improves safety and comfort of the user, as well as protects sensitive components of the wheelchair such as rims, tires, axles, drivetrains, handles, and/or other components. Disclosed embodiments can be used with conventional manual wheelchairs and/or motorized wheelchairs. Thus, disclosed embodiments offer significant improvements to many varieties of wheelchair, and improve the user-experience and safety of the users of the wheelchairs.

While the invention has been particularly shown and described in conjunction with exemplary embodiments, it will be appreciated that variations and modifications will occur to those skilled in the art. The embodiments according to the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A wheelchair, comprising:

a first wheelchair bumper wing affixed to a first side of the wheelchair;

a second wheelchair bumper wing affixed to a second side of the wheelchair;

two front wheels and two rear wheels, wherein each wheelchair bumper wing extends outside of a respective rear wheel;

wherein the first wheelchair bumper wing and the second wheelchair bumper wing each comprise:

an elongated member, wherein the elongated member comprises:

a front section including a front mount including a front hook, wherein the front section is attached to the wheelchair by the front hook engaging a corresponding front ring affixed to the wheelchair;

a middle section;

a rear section including a spring-loaded rear mount, wherein the spring-loaded rear mount includes:

a spring configured to absorb force due to a collision; and a rear hook, wherein the rear section is attached to the wheelchair by the rear hook engaging a corresponding rear ring affixed to the wheelchair; and wherein the middle section flares at a flare angle with respect to a longitudinal tangent line.

2. The wheelchair bumper wing of claim 1, wherein the front mount comprises two front wheelchair mounts.

3. The wheelchair of claim 1, wherein for the first wheelchair bumper wing and the second wheelchair bumper wing, the flare angle has a value ranging from 130 degrees to 170 degrees.

4. The wheelchair of claim 1, wherein for the first wheelchair bumper wing and the second wheelchair bumper wing, the flare angle has a value ranging from 145 degrees to 160 degrees.

5. The wheelchair of claim 1, wherein the first wheelchair bumper wing and the second wheelchair bumper wing, each are comprised of steel, aluminum, fiberglass, plastic, or polycarbonate.

6. The wheelchair of claim 1, wherein the first wheelchair bumper wing and the second wheelchair bumper wing, each have a deflection capability ranging from 10 millimeters to 30 millimeters.

7. The wheelchair of claim 1, wherein the first wheelchair bumper wing and the second wheelchair bumper wing, each have a deflection capability ranging from 5 millimeters to 20 millimeters.

8. The wheelchair of claim 1, wherein the first wheelchair bumper wing and the second wheelchair bumper wing, each have a deflection capability ranging from 15 millimeters to 25 millimeters.

* * * * *